(12) United States Patent
Chen et al.

(10) Patent No.: US 11,488,559 B2
(45) Date of Patent: Nov. 1, 2022

(54) DISPLAY ASSEMBLY INCLUDING A FIRST DISPLAY PANEL AND A SECOND DISPLAY PANEL STACKED OVER THE FIRST DISPLAY PANEL FOR IMPROVING A CONTRAST RATIO, AND DISPLAY DEVICE

(71) Applicants: Beihai HKC Optoelectronics Technology Co., Ltd., Beihai (CN); HKC Corporation Limited, Shenzhen (CN)

(72) Inventors: Cheng-Hung Chen, Beihai (CN); Wei Li, Beihai (CN)

(73) Assignees: BEIHAI HKC OPTOELECTRONICS TECHNOLOGY CO., LTD., Beihai (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/340,078

(22) Filed: Jun. 6, 2021

(65) Prior Publication Data
US 2022/0036848 A1 Feb. 3, 2022

(30) Foreign Application Priority Data

Jul. 31, 2020 (CN) .......................... 202010756102.1
Jul. 31, 2020 (CN) .......................... 202021569875.0

(51) Int. Cl.
| | |
|---|---|
| *G09G 3/30* | (2006.01) |
| *G09G 3/36* | (2006.01) |
| *G02F 1/133* | (2006.01) |
| *G02F 1/1335* | (2006.01) |
| *G02F 1/1347* | (2006.01) |

(52) U.S. Cl.
CPC ......... *G09G 3/3685* (2013.01); *G02F 1/1347* (2013.01); *G02F 1/13306* (2013.01); *G02F 1/133514* (2013.01); *G02F 1/133531* (2021.01); *G09G 3/3696* (2013.01); *G09G 2300/023* (2013.01); *G09G 2310/08* (2013.01); *G09G 2330/00* (2013.01)

(58) Field of Classification Search
CPC .............. G09G 3/3685; G09G 3/3696; G09G 2300/023; G09G 2310/08; G09G 2330/00; G02F 1/13306; G02F 1/133514; G02F 1/133531; G02F 1/1347
See application file for complete search history.

(56) References Cited

U.S. PATENT DOCUMENTS

| | | | | |
|---|---|---|---|---|
| 2009/0051707 | A1* | 2/2009 | Hirata | G09G 3/3648 348/731 |
| 2009/0225107 | A1* | 9/2009 | Nose | G09G 3/3611 345/697 |
| 2019/0361659 | A1* | 11/2019 | Hyun | G09G 3/3258 |

FOREIGN PATENT DOCUMENTS

| | | |
|---|---|---|
| CN | 102650779 | 8/2012 |
| CN | 111025748 A | 4/2020 |

* cited by examiner

*Primary Examiner* — Sanghyuk Park

(57) ABSTRACT

The present application discloses a display assembly and a display device. The display assembly includes a first display panel, a second display panel and a driving circuit; the second display panel is arranged in a stack with the first display panel; the first display panel and the second display panel have the same resolution, and the driving circuit outputs the same data driving signal to the first display panel and the second display panel; light emitting surfaces of the first display panel and the second display panel face the same direction.

12 Claims, 5 Drawing Sheets

DISPLAY ASSEMBLY INCLUDING A FIRST DISPLAY PANEL AND A SECOND DISPLAY PANEL STACKED OVER THE FIRST DISPLAY PANEL FOR IMPROVING A CONTRAST RATIO, AND DISPLAY DEVICE

The present application claims priority to Chinese Patent Application No. 202010756102.1, filed Jul. 3, 2020 and No. 202021569875.0, filed Jul. 31, 2020, which is hereby incorporated by reference herein as if set forth in its entirety.

TECHNICAL FIELD

The present application relates to the field of display technologies, particularly to a display assembly and a display device.

BACKGROUND

The statements herein merely provide background information related to the present application and do not necessarily constitute the conventional art.

Display devices, such as liquid crystal display devices, have many advantages, for example such as thin body, power saving, and flee of radiation, and have been widely used. Most liquid crystal display devices are backlight type display devices, which include a display assembly (including a display panel and a backlight module). The working principle of the display assembly is to place liquid crystal molecules in two parallel substrates and apply driving voltage on the two substrates to control the rotation direction of the liquid crystal molecules to refract the light of the backlight modules to generate a picture.

However, as people's pursuit of quality becomes higher and higher, the relatively lower display contrast and the like of existing liquid crystal display devices are difficult to meet the pursuit of higher display quality of some people, to improve the display contrast of the liquid crystal display devices remains an urgent problem to be solved by those skilled in the art.

SUMMARY

The purpose of the present application is to provide a display assembly and a display device to improve the contrast of the display device.

The present application discloses a display assembly including, a first display panel, a second display panel and a driving circuit, where the second display panel is arranged in a stack with the first display panel; the driving circuit drives the first display panel and the second display panel to display pictures; the first display panel and the second display panel have the same resolution, and the driving circuit outputs the same data driving signal to the first display panel and the second display panel; light emitting surfaces of the first display panel and the second display panel face the same direction.

The present application further discloses a driving method for the display assembly, the method includes:

receiving an information source signal; and processing according to the information source signal, and simultaneously outputting a first data driving signal, a second data driving signal and a timing control signal to drive a first display panel and a second display panel;

where the first data driving signal and the second data driving signal are the same, the first data driving, signal is output to the first display panel, the second data driving signal is output to the second display panel, and the timing control signal is simultaneously output to the first display panel and the second display panel.

The present application also discloses a display device including the display assembly disclosed herein.

For the solution that the display assembly only includes a single-layer display panel, the display assembly of the present application includes a first display panel and a second display panel. The dual-layer display panel enables the ratio of the brightness of a point on the screen of the display assembly when the screen is brightest (white) to the brightness of the same point when the screen is darkest (black) to be increased, so that the display contrast is greatly improved; moreover, the first display panel and the second display panel have the same resolution, and the driving circuit outputs the same data driving signal to drive the first display panel and the second display panel to display the picture, so that the two data driving signals do not need to carry out an extra algorithm chip to process the data driving signal and the like to meet the driving of the display panels with different resolutions, in which the driving architecture is simple, and the display contrast is improved while the production cost is favorably reduced.

BRIEF DESCRIPTION OF DRAWINGS

The accompanying drawings, which are included to provide a further understanding of embodiments of the present application and constitute a part of the specification, illustrate embodiments of the application and, together with the text description, explain the principles of the application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

It should be understood that the terminology, specific structural and functional details disclosed are merely exemplary for the purpose of describing specific embodiments.

However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "horizontally", "up", "down", "left", "right", "vertical", "horizontal", "top", "bottom", "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation, be configured and operated in a particular orientation, and therefore cannot be construed as limiting the present application.

In addition, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, or an internal connection between two elements. For those skilled in the art, the specific meaning of the above terms in this application can be understood according to the specific circumstances.

Figure 1:
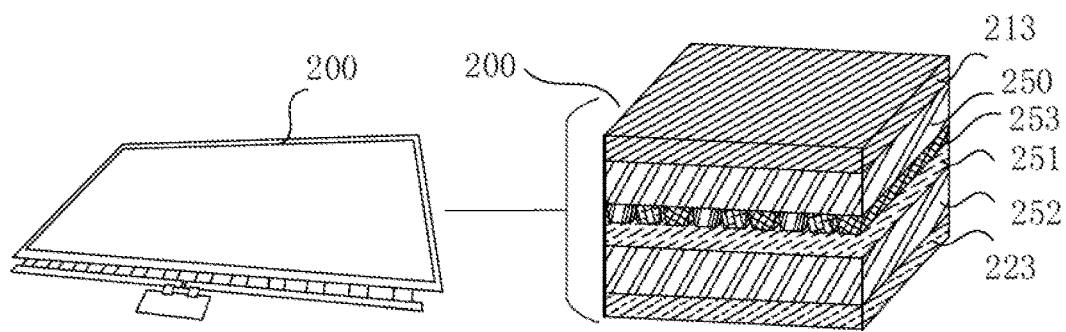
FIG. 1 is a schematic diagram of an exemplary display assembly according to the present application.

FIG. 1 is a schematic diagram of an exemplary display assembly according to the present application, referring to FIG. 1, the drawing on the left side in the figure is an overall structure diagram of the display assembly including only a single-layer display panel, and the drawing on the right side in the figure is a corresponding cross-sectional view showing a specific film layer structure of the display assembly including only a single-layer display panel. Specifically, the display assembly 200 includes an upper polarizer 213, an upper substrate 250, a liquid crystal layer 251, a lower substrate 252 and a lower polarizer 223, where a color filter layer 253 is correspondingly arranged on the upper substrate 250 or the lower substrate 252, and a backlight module may be arranged on a side of the lower polarizer 223 away from the upper polarizer 213 to provide a light source. However, such a structure is inferior to a display panel such as an Organic Light-Emitting Diode (OLED) in characteristics such as a display contrast of the display assembly. Therefore, the applicant improves the display structure of the display assembly to obtain the improved display assembly below.

Figure 2:
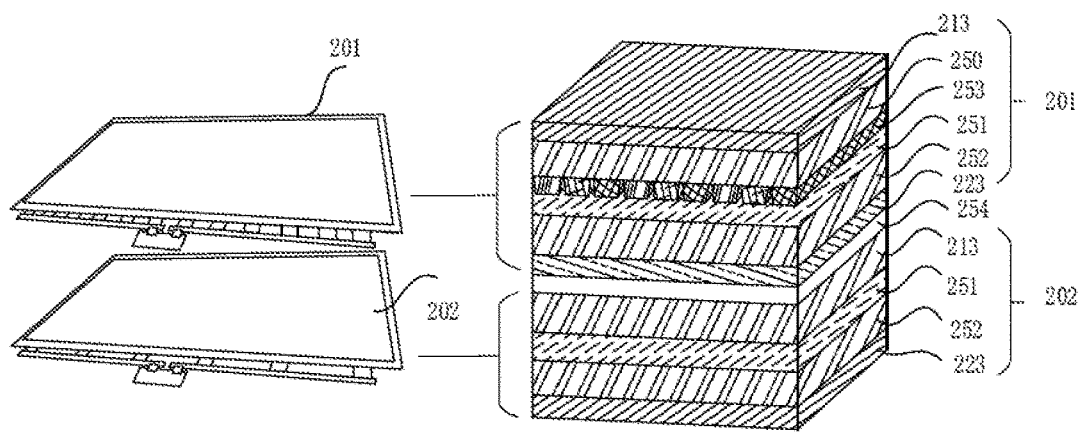
FIG. 2 is a schematic diagram of an improved display assembly according to the present application.

FIG. 2 is a schematic diagram of an improved display assembly according to the present application, referring to FIG. 2, the drawing on the left side in the figure is an overall structure diagram of the display assembly including a dual-layer display panel, and the drawing on the right side in the figure is a corresponding cross-sectional view showing a specific film layer structure of the display assembly including the dual-layer display panel. Specifically, the display assembly includes a first display panel 201 and a second display panel 202 arranged in a stack, where the first display panel 201 and the second display panel 202 each includes an upper polarizer 213, an upper substrate 250, a liquid crystal layer 251, a lower substrate 252, and a lower polarizer 223. A backlight module is arranged on a side of the second display panel away from the first display panel, the first display panel has a color filter layer 253 arranged on the upper substrate 250 or the lower substrate 252, and the second display panel 202 does not have the color filter layer 253, that is, the first display panel 201 is a color Liquid Crystal Display (LCD), and the second display panel 202 is a black and white LCD; and the resolution of the first display panel 201 is greater than that of the second display panel 202, specifically, the resolution of the first display panel 201 is n times that of the second display panel 202, with n being greater than or equal to 2. The applicant finds that the display contrast of the improved display assembly is improved, but the color saturation is not obviously improved, and because the resolutions of the two display panels are different, two timing controllers with different resolutions are required, and additional algorithm chips are required for generating data driving information and the like corresponding to the second display panel to realize the display performance of the dual-layer display assembly, so that the driving architecture is complex, and the cost is greatly increased. Based on the above, the applicant has further improved the solution as follows.

The present application will now be described in details by reference to the accompanying drawings and optional embodiments.

Figure 3:
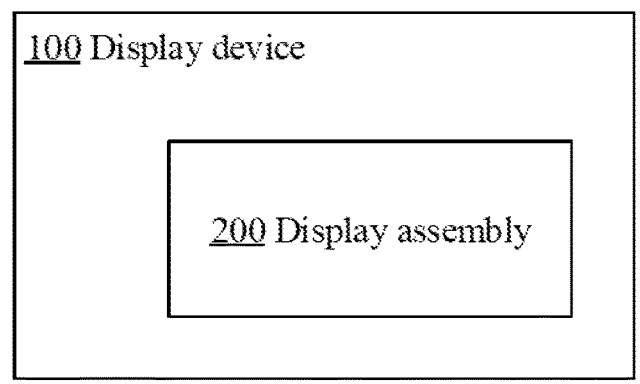
FIG. 3 is a schematic diagram of a display device according to an embodiment of the present application.

FIG. 3 is a schematic diagram of a display device according to an embodiment of the present application, and referring to FIG. 1, the present application discloses a display device 100 including a display assembly 200 disclosed herein.

The present application discloses the display assembly as follows.

Figure 4:
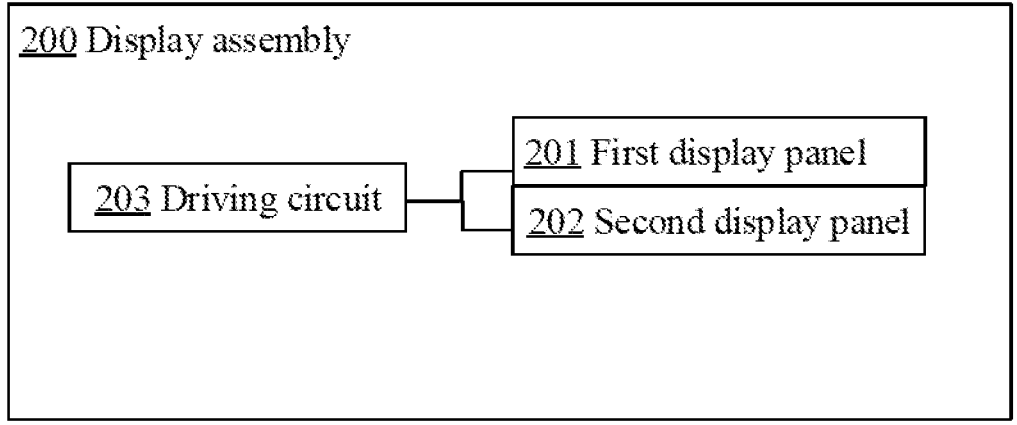
FIG. 4 is a schematic diagram of a display assembly according to an embodiment of the present application.

FIG. 4 is a schematic diagram of a display assembly according to an embodiment of the disclosure, and referring to FIG. 2, the display assembly 200 includes a first display panel 201, a second display panel 202, and a driving circuit 203, where the second display panel 202 is arranged in a stack with the first display panel 201. The driving circuit 203 drives the first display panel 201 and the second display panel 202 to display pictures; the first display panel 201 and the second display panel 202 have the same resolution, and the driving circuit 203 outputs the same data driving signal to the first display panel 201 and the second display panel 202; light emitting surfaces of the first display panel 201 and the second display panel 202 face the same direction.

For the solution that the display assembly only includes a single-layer display panel, the display assembly 200 of the present application includes a first display panel 201 and a second display panel 202. The dual-layer display panel enables the ratio of the brightness of a point on the screen of the display assembly when the screen is brightest (white) to the brightness of the same point when the screen is darkest (black) to be increased, so that the display contrast is greatly improved; moreover, the first display panel 201 and the second display panel 202 have the same resolution, and the driving circuit 203 outputs the same data driving signal to drive the first display panel 201 and the second display panel 202 to display the picture, so that the two data driving signals do not need to carry out an extra algorithm chip to process the data driving signal and the like to meet the driving of the display panels with different resolutions, in which the driving architecture is simple, and the display contrast is improved while the production cost is favorably reduced.

Figure 5:
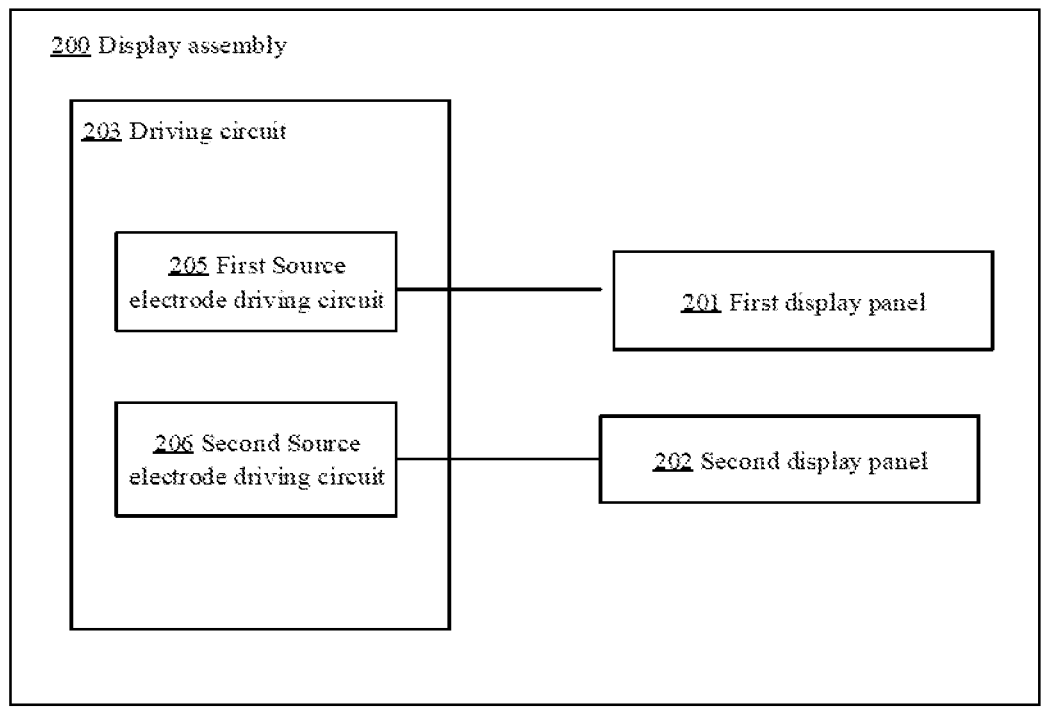
FIG. 5 is a schematic diagram of different source electrode driving circuits driving different display panels according to an embodiment of the present application.

FIG. 5 is a schematic diagram of different source electrode driving circuits driving different display panels according to an embodiment of the present application, and in combination with FIGS. 3 and 4, specifically, the driving circuit 203 includes: a first source electrode driving circuit 205 and a second source electrode driving circuit 206, where the first source electrode driving circuit 205 receives a first information source signal and outputs a first data driving signal to drive the first display panel 201; the second source electrode driving circuit 206 receives a second information source signal and outputs a second data driving signal to drive the second display panel 202; where the first information source signal and the second information source signal are the same, and the first data driving signal and the second data driving signal are the same. The first information source signal and the second information source signal being the same means that the received information source signals are the same at the same time, and the first data driving signal and the second data driving signal being the same means that the data driving signals output to the two display panels are the same at the same time; the first source electrode driving circuit and the second source electrode driving circuit receive the same information source signal and then output the same data driving signal to drive and display the same picture, so that the display contrast is improved, and meanwhile, the display quality is improved; and because the signal source signal is the same as the data driving signal, an additional algorithm chip or circuit is not needed for processing the signal, the production cost is favorably reduced.

Figure 6:
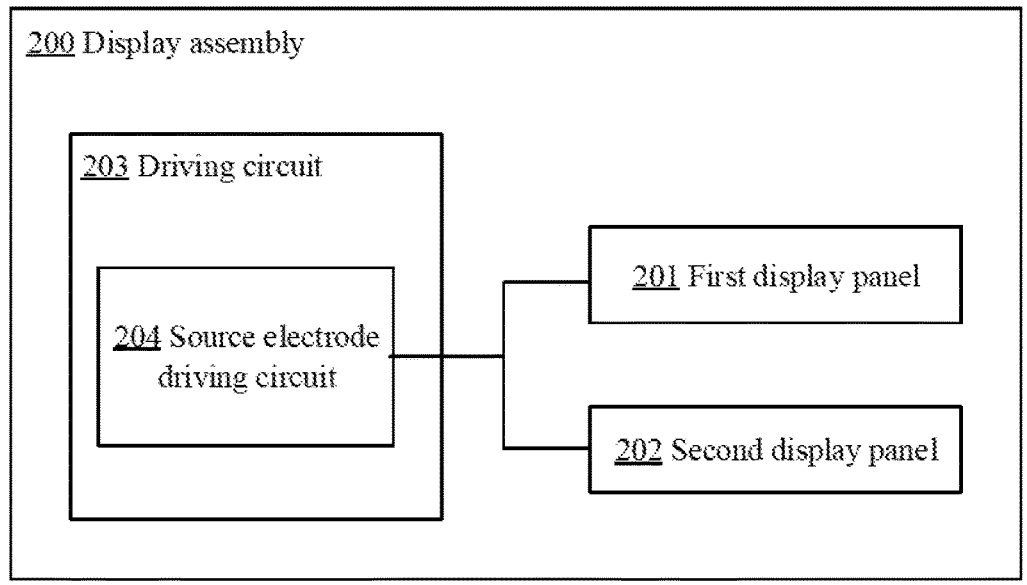
FIG. 6 is a schematic diagram of the same source electrode driving circuit driving different display panels according to an embodiment of the present application.

FIG. 6 is a schematic diagram of the same source electrode driving circuit driving different display panels according to an embodiment of the present application, and the source electrode driving circuit may also be shared, that is, the driving circuit 203 includes a source electrode driving circuit 204, and the source electrode driving circuit 204 receives an information source signal and outputs a first data driving signal and a second data driving signal, where the source electrode driving circuit outputs the first data driving signal to the first display panel 201 and the second data driving signal to the second display panel 202; where the first data driving signal and the second data driving signal are the same. The source electrode driving circuit 204 is shared for driving two display panels, so that the space occupation can be saved and the space utilization rate can be improved.

Figure 7:
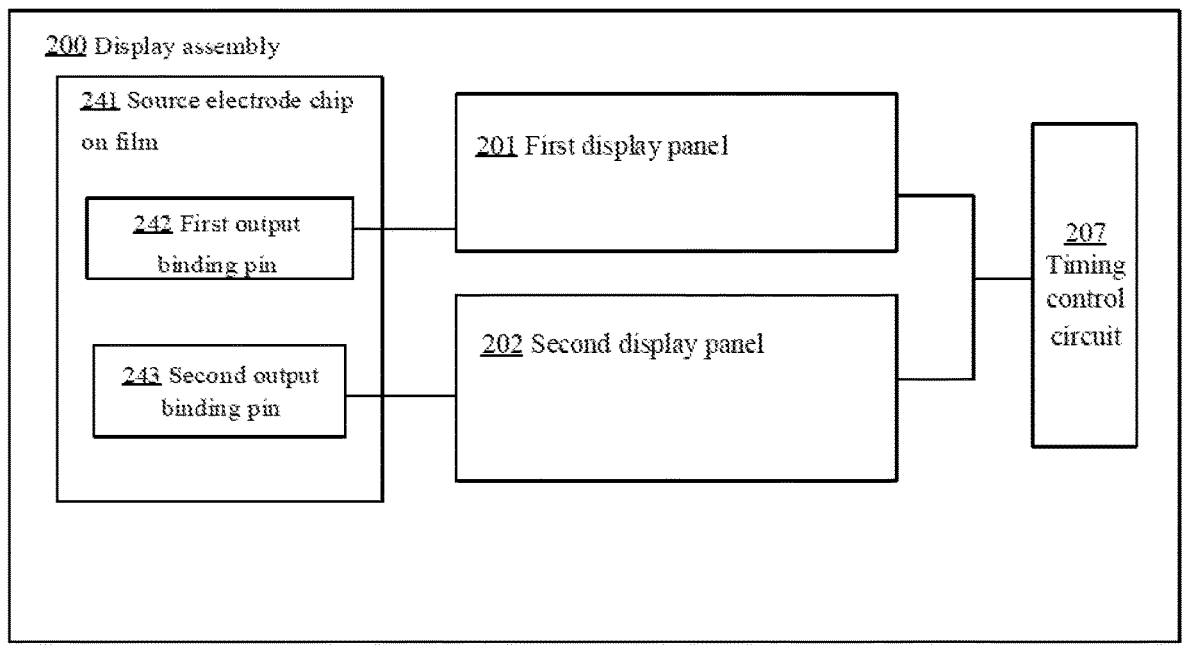
FIG. 7 is a schematic diagram of the same source electrode chip on film driving different display panels according to an embodiment of the present application.

FIG. 7 is a schematic diagram of the same source electrode chip on film driving different display panels according to an embodiment of the present application, and in combination with FIGS. 3 to 6, the solution of the sharing of the source electrode driving circuit can be varied, for example, the source electrode driving circuit 204 can include at least one source electrode chip on film 241 with the source electrode driving circuit 204 arranged thereon; the source electrode chip on film 241 includes a first output binding pin 242 and a second output binding pin 243, where the first output binding pin 242 is bound to the first display panel 201, and the second output binding pin 243 is bound to the second display panel 202. The source electrode chip on film 241 is shared, the source electrode chip on film 241 is provided with a source electrode driving chip, which can also be shared, and then a first output binding pin 242 and a second output binding pin 243 from the same source electrode chip on film 241 are bound and connected to the two display panels respectively. The source electrode driving chip can be two source electrode driving chips or one source electrode driving chip, and when only one source electrode driving chip is arranged on one source electrode chip on film, two groups of identical output binding pins can be provided to ensure the consistency of output data signals.

Another important improvement of the present application is: the display assembly further includes a timing control circuit 207 that outputs the same timing control signal to the first display panel 201 and the second display panel 202. The consistency of the timing control signals may ensure the consistency of the picture displays of the first display panel and the second display panel, thereby avoiding the problems of disordered picture display and the like while improving the display contrast.

Specifically, the display assembly includes a print circuit board with the timing control circuit 207 arranged thereon; the source electrode driving circuit includes at least one first source electrode chip on film and at least one second source electrode chip on film, where the first source electrode chip on film is bound to a first surface of the print circuit board close to the first display panel, and the second source electrode chip on film is formed on a second surface of the print circuit board close to the second display panel, where the first surface and the second surface are two surfaces of the print circuit board arranged opposite to each other. The first source electrode chip on film and the second source electrode chip on film are respectively arranged being bound and connected to two surfaces of the print circuit board, which improves the space occupancy rate of the print circuit board, and reduces the length of wiring as much as possible, thus facilitating to reduce the impedance loss while improving space occupancy rate of the print circuit board.

The timing control circuit may include a first interface and a second interface, where the first interface outputs a first timing control signal to the first display panel, and the second interface outputs a second timing control signal to the second display panel. The setting mode of the timing control circuit can be varied, as long as the same timing control signal is output to the first display panel and the second display panel to ensure that the timings are corresponding. Specifically, the timing control circuit may be arranged on the print circuit board, and the print circuit board may be provided with at least one first interface and at least one second interface corresponding to the timing control circuit, and configured to be bound and connected to the first display panel and the second display panel through the source electrode chip on film (the source electrode chip on film may also be directly or indirectly connected to the two display panels through the adaptive connector) respectively, to implement the use of the print circuit board and the timing control circuit together.

Figure 8:
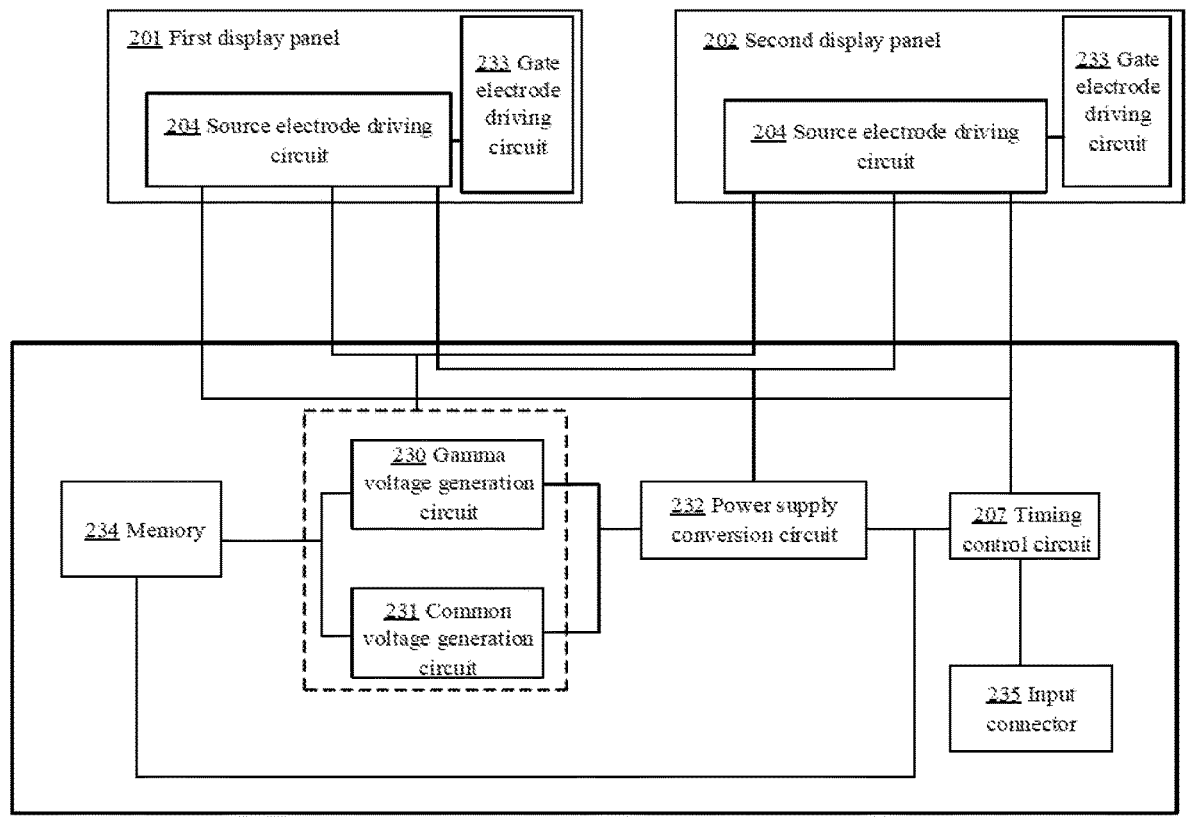
FIG. 8 is a schematic circuit block diagram of a display assembly according to an embodiment of the present application.

FIG. 8 is a schematic circuit block diagram of a display assembly according to an embodiment of the present application, and in combination with FIGS. 3 to 7, the present application also improves other circuits of the display assembly, specifically, the display assembly further includes a gamma voltage generation circuit 230, a common voltage generation circuit 231, and a power supply conversion circuit 232, where the gamma voltage generation circuit 230 outputs the same gamma voltage to the first display panel 201 and the second display panel 202; the common voltage generation circuit 231 outputs the same common voltage to the first display panel 201 and the second display panel 202; the power supply conversion circuit 232 outputs the same data power supply voltage to the source electrode driving circuits 204 corresponding to the first display panel 201 and the second display panel 202, and outputs the same gate electrode power supply voltage to the gate electrode driving circuits 233 corresponding to the first display panel 201 and the second display panel 202; specifically, the power supply conversion circuit and the common voltage circuit may be connected to the source electrode driving circuits in the first display panel and the second display panel, and then transmit the power supply voltage and the like required by the gate electrode driving circuit and the like through an additional wiring or an idle pin on the source electrode chip on film where the source electrode driving circuit is located, or transmit the common voltage to the common line of the corresponding display panel. In addition, the display assembly further includes an input connector 235, a memory 234 and the like, where the input connector 235 is configured for transmitting an externally transmitted information source signal to the timing control circuit 207 and the like, and the memory 234 is configured for being connected to the timing control circuit 207, the gamma voltage generation circuit, the common voltage generation circuit and the like to help generate an adaptive timing control signal, gamma voltage, common voltage and the like; where the gamma voltage generation circuit and the common voltage generation circuit can be integrated into a gamma voltage and common voltage generator; therefore various circuits can be used with their corresponding electronic components, such that the number of the independent electronic components is far lower than that of the two display panels working independently, which reduces the space occupation as well as the cost; where the power supply conversion circuit more specifically includes a direct current to direct current conversion circuit.

Figure 9:
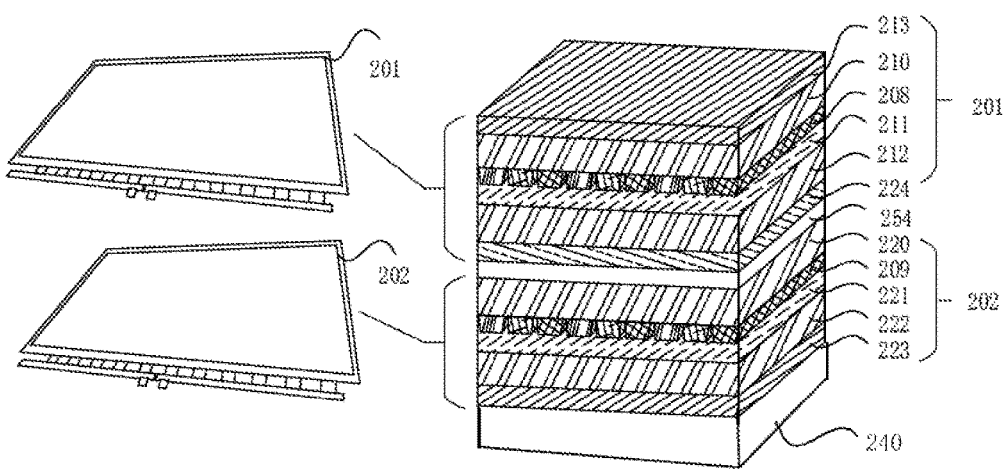
FIG. 9 is a schematic diagram of a film layer structure of a display assembly according to an embodiment of the present application.

FIG. 9 is a schematic diagram of a film layer structure of a display assembly according to an embodiment of the present application, and in combination with FIGS. 3 to 8, the drawing on the left side in the figure is an overall structure diagram of the display assembly including a dual-layer display panel, and the drawing on the right side in the figure is a corresponding cross-sectional view showing a specific film layer structure of the display assembly including a dual-layer display panel. Specifically, in addition to improving the circuits, the film layer structure of the display assembly is also improved, in the present application, the first display panel 201 and the second display panel 202 are fixed by binding with an Optical Clear Adhesive (OCA) 254; the first display panel 201 sequentially includes, from top to bottom, a first substrate 210, a second substrate 212, and a first liquid crystal layer 211 arranged between the first substrate 210 and the second substrate 212; the second display panel 202 sequentially includes, from top to bottom, a third substrate 220, a fourth substrate 222, and a second liquid crystal layer 221 arranged between the third substrate 220 and the fourth substrate 222; where the thicknesses of the first liquid crystal layer 211 and the second liquid crystal layer 221 are the same. That is, the first liquid crystal layer and the second liquid crystal layer have the same thickness on the basis of the same other conditions (e.g., materials, etc.), so that the first liquid crystal layer and the second liquid crystal layer have the same transmittance. The OCA 254 is disposed between the second substrate 212 and the third substrate 220 to bind and fix the second substrate 212 and the third substrate 220.

To enable the first display panel 201 and the second display panel 202 to display the same picture, the display assembly further includes a first color filter layer 208 and a second color filter layer 209, the first color filter layer 208 is correspondingly arranged on the first display panel 201, and the second color filter layer 209 is correspondingly arranged on the second display panel 202; where the first color filter layer 208 and the second color filter layer 209 each includes a plurality of color resists for different colors, and the color resists for the same color in the first color filter layer 208 and the second color filter layer 209 are arranged correspondingly in the direction perpendicular to the light emitting surface of the first display panel 201. The stacked arrangement of the dual-layer color filter layers is not only beneficial to improving the display contrast, but also beneficial to improving the color saturation of the display assembly as the total thickness of the color filter layers is increased, the filtering capability is enhanced, and the corresponding light spectrum is narrowed; moreover, the arrangement of the dual-layer color filter layers can avoid the problems that the manufacturing process is not allowed or the yield is too low when the thickness of a single-layer color filter layer is increased to twice; where the first color filter layer and the second color filter layer both may be arranged in the first display panel or the second display panel, and more specifically, may be arranged on both surfaces of the first substrate close to and away from the second substrate, taking the first display panel as an example.

Specifically, the first color filter layer includes a plurality of first red resists, a plurality of first green resists, and a plurality of first blue resists, the second color filter layer includes a plurality of second red resists, a plurality of second green resists, and a plurality of second blue resists, where the plurality of first red resists and the plurality of second red resists have the same thickness and are arranged correspondingly in the direction perpendicular to the light-emitting surface of the first display panel; the plurality of first green resists and the plurality of second green resists have the same thickness and are arranged correspondingly in the direction perpendicular to the light-emitting surface of the first display panel; the plurality of first blue resists and the plurality of second blue resists have the same thickness and are arranged correspondingly in the direction perpendicular to the light emitting surface of the first display panel. That is, the first color filter layer and the second color filter layer have the same thickness and are arranged correspondingly on the basis of the same other conditions (including materials and the like). The color resist included in the first color filter layer and the second color filter layer of the present application may be red green blue (RGB) resist, red green blue white (RGBW) resist, red green blue yellow (RGBY) resist, and resists of other colors, as long as they are applicable.

The display assembly further includes an upper polarizer 213, a lower polarizer 223 and a middle polarizer 224, the upper polarizer 213 is arranged on the first display panel 201, the lower polarizer 223 is arranged on the second display panel 202, and the middle polarizer 224 is arranged between the upper polarizer 213 and the lower polarizer 223. The upper polarizer 213 and the lower polarizer 223 have the same polarization direction, and the middle polarizer 224 is perpendicular to the polarization direction of the upper polarizer 213 and the lower polarizer 223. The upper polarizer 213 may be arranged on the first substrate 210, the lower polarizer 223 may be arranged on the fourth substrate 222, and the middle polarizer 224 may be arranged on the second substrate 212 or the third substrate 220, and more specifically, may be arranged on a side of the second substrate 212 close to the third substrate 220 or a side of the third substrate 220 close to the second substrate 212. The arrangement of three polarizers with the middle one being shared reduces the number of the polarizers being used, and the reasonable cooperation of the three polarizers is favorable for improving the contrast and the color saturation.

Referring to FIGS. 3 to 9, the present application further discloses a display assembly 200 including a first display panel 201, a second display panel 202, a backlight module 240, a source electrode chip on film 241, and a timing control circuit 207, where the second display panel 202 is arranged in a stack with the first display panel 201, and the first display panel 201 and the second display panel 202 have the same resolution. The second display panel 202 is arranged between the first display panel 201 and the backlight module 240, a plurality of source electrode chip on films 241 are provided, each of which includes a first output binding pin 242 and a second output binding pin 243, the first output binding pin 242 is bound to the first display panel 201, and the second output binding pin 243 is bound to the second display panel 202; the first and second output binding pins 242 and 243 output the same data driving signal to the first and second display panels 201 and 202. The timing control circuit 207 is configured to output the same timing control signal to the first display panel 201 and the second display panel 202. The display assembly 200 further includes a first color filter layer 208 and a second color filter layer 209, where the first color filter layer 208 is correspondingly arranged on the first display panel 201, and the second color filter layer 209 is correspondingly arranged on the second display panel 202; where the first color filter layer 208 and the second color filter layer 209 each includes a plurality of color resists for different colors, and the color resists for the same color in the first color filter layer 208 and the second color filter layer 209 are arranged correspondingly in the direction perpendicular to the light emitting surface of the first display panel 201. This solution can not only improve the display contrast and color saturation, but also realize the sharing of the backlight module, which saves space occupation and reduces power consumption.

Figure 10:
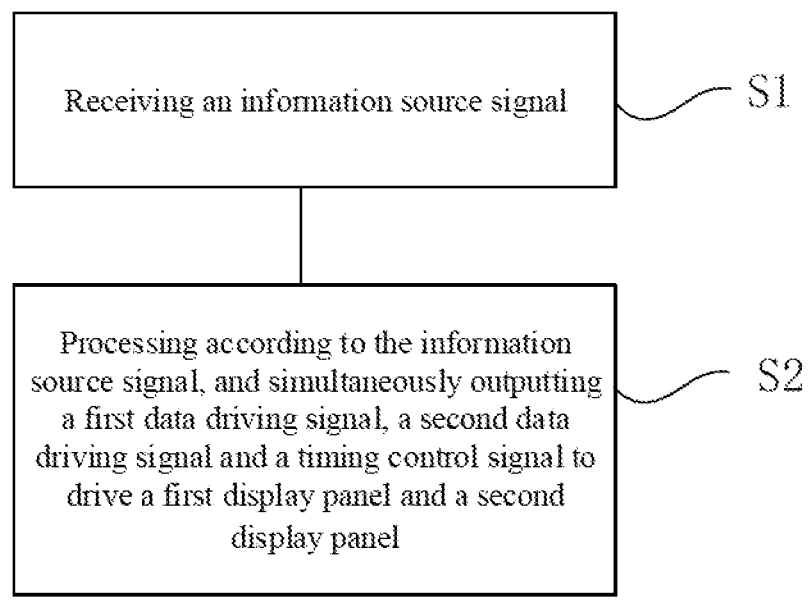
FIG. 10 is a flowchart of a driving method for a display assembly according to an embodiment of the present application.

FIG. 10 is a flowchart of a driving method for a display assembly according to an embodiment of the present application, and in combination with FIGS. 3 to 9, the present application further discloses a driving method for a display assembly, including:

S1: receiving an information source signal;

S2: processing according to the information source signal, and simultaneously outputting a first data driving signal, a second data driving signal and a timing control signal to drive a first display panel and a second display panel;

where the first data driving signal and the second data driving signal are the same, the first data driving signal is output to the first display panel, the second data driving signal is output to the second display panel, and the timing control signal is simultaneously output to the first display panel and the second display panel.

It should be noted that, the limitation of the steps involved in this solution, without affecting the implementation of the specific solution, is not determined to limit the sequence of steps, and the previous steps may be executed first, later, or even simultaneously; similarly, various related technical features in this solution can be combined without conflict. As long as the solution can be implemented, the technical features shall fall within the protection scope of the present application.

The technical solution of the present application can be applied to a wide variety of display assemblies, such as Twisted Nematic (TN) display assemblies, In-Plane Switching (IPS) display assemblies, Vertical Alignment (VA) display assemblies, Multi-domain Vertical Alignment (MVA) display assemblies, and other types of display assemblies.

The above content is a further detailed description of the present application in conjunction with specific, optional embodiments, and it is not to be construed that specific embodiments of the present application are limited to these descriptions. For those of ordinary skill in the art to which this application belongs, a number of simple derivations of substitutions may be made without departing from the spirit of this application, all of which shall be deemed to fall within the scope of this application.

What is claimed is:

1. A display assembly, comprising:
a first display panel;
a second display panel arranged in a stack with the first display panel; and
a driving circuit configured to drive the first display panel and the second display panel to display pictures;
wherein the first display panel and the second display panel have the same resolution, and the driving circuit is configured to output the same data driving signal to the first display panel and the second display panel;
light emitting surfaces of the first display panel and the second display panel face the same direction;
wherein the driving circuit comprises:
a source electrode driving circuit configured to receive an information source signal and output a first data driving signal and a second data driving signal, wherein the source electrode driving circuit outputs the first data driving signal to the first display panel and the second data driving signal to the second display panel;
wherein the first data driving signal and the second data driving signal are the same;
wherein the display assembly comprises a print circuit board, and the print circuit board is provided with a timing control circuit;
wherein the source electrode driving circuit comprises at least one first source electrode chip on film and at least one second source electrode chip on film, the first source electrode chip on film is bound to a first surface of the print circuit board close to the first display panel, and the second source electrode chip on film is formed on a second surface of the print circuit board close to the second display panel.

2. The display assembly according to claim 1, wherein the display assembly further comprises:
a timing control circuit configured to output the same timing control signal to the first display panel and the second display panel.

3. The display assembly according to claim 2, wherein the display assembly further comprises:
a gamma voltage generation circuit configured to output the same gamma voltage to the first display panel and the second display panel;
a common voltage generation circuit configured to output the same common voltage to the first display panel and the second display panel; and
a power supply conversion circuit configured to output the same data power supply voltage to the source electrode driving circuits corresponding to the first display panel and the second display panel, and output the same gate electrode power supply voltage to gate electrode driving circuits corresponding to the first display panel and the second display panel.

4. The display assembly according to claim 1, wherein the display assembly further comprises:
a first color filter layer correspondingly arranged on the first display panel;

a second color filter layer correspondingly arranged on the second display panel;

wherein the first color filter layer and the second color filter layer each comprises a plurality of color resists for different colors, and the color resists for the same color in the first color filter layer and the second color filter layer are arranged correspondingly in the direction perpendicular to the light emitting surface of the first display panel.

5. The display assembly of claim 4, wherein the first color filter layer and the second color filter layer comprise any one of a red green blue resist, a red green blue white resist, or a red green blue yellow resist.

6. The display assembly according to claim 1, wherein the first display panel comprises a first substrate, a second substrate and a first liquid crystal layer arranged between the first substrate and the second substrate; the second display panel comprises a third substrate, a fourth substrate and a second liquid crystal layer arranged between the third substrate and the fourth substrate;

wherein the first liquid crystal layer and the second liquid crystal layer have the same thickness.

7. The display assembly according to claim 1, wherein the display assembly further comprises:
an upper polarizer arranged on the first display panel;
a lower polarizer arranged on the second display panel; and
a middle polarizer arranged between the upper polarizer and the lower polarizer;
wherein the upper polarizer and the lower polarizer have the same polarization direction, and the middle polarizer is perpendicular to the polarization direction of the upper polarizer and the lower polarizer.

8. The display assembly according to claim 7, wherein the first display panel comprises a first substrate and a second substrate; the second display panel comprises a third substrate and a fourth substrate; the upper polarizer is arranged on the first substrate, the lower polarizer is arranged on the fourth substrate, and the middle polarizer is arranged on a side surface of the second substrate close to the third substrate.

9. The display assembly according to claim 1, wherein the first surface and the second surface are two surfaces of the print circuit board arranged opposite to each other.

10. The display assembly according to claim 1, wherein the timing control circuit comprises a first interface and a second interface, the first interface outputs a first timing control signal to the first display panel, the second interface outputs a second timing control signal to the second display panel, and at least one first interface and at least one second interface are arranged on the print circuit board corresponding to the timing control circuit and respectively bound to the first display panel and the second display panel through a source electrode chip on film.

11. A driving method for a display assembly, comprising:
receiving, by a driving circuit of the display assembly, an information source signal; and
processing according to the information source signal, and simultaneously outputting a first data driving signal, a second data driving signal and a timing control signal to drive a first display panel and a second display panel;
wherein the first data driving signal and the second data driving signal are the same, the first data driving signal is output to the first display panel, the second data driving signal is output to the second display panel, and the timing control signal is simultaneously output to the first display panel and the second display panel; light emitting surfaces of the first display panel and the second display panel face the same direction;

wherein the second display panel is arranged in a stack with the first display panel, wherein the first display panel and the second display panel have the same resolution;

wherein the driving circuit comprises:
a source electrode driving circuit configured to receive an information source signal and output a first data driving signal and a second data driving signal, wherein the source electrode driving circuit outputs the first data driving signal to the first display panel and the second data driving signal to the second display panel;

wherein the first data driving signal and the second data driving signal are the same;

wherein the display assembly comprises a print circuit board, and the print circuit board is provided with a timing control circuit;

wherein the source electrode driving circuit comprises at least one first source electrode chip on film and at least one second source electrode chip on film, the first source electrode chip on film is bound to a first surface of the print circuit board close to the first display panel, and the second source electrode chip on film is formed on a second surface of the print circuit board close to the second display panel.

12. A display device comprising a display assembly, the display assembly comprises:
a first display panel;
a second display panel arranged in a stack with the first display panel; and
a driving circuit configured to drive the first display panel and the second display panel to display pictures;
wherein the first display panel and the second display panel have the same resolution, and the driving circuit is configured to output the same data driving signal to the first display panel and the second display panel; light emitting surfaces of the first display panel and the second display panel face the same direction;

wherein the driving circuit comprises:
a source electrode driving circuit configured to receive an information source signal and output a first data driving signal and a second data driving signal, wherein the source electrode driving circuit outputs the first data driving signal to the first display panel and the second data driving signal to the second display panel;

wherein the first data driving signal and the second data driving signal are the same;

wherein the display assembly comprises a print circuit board, and the print circuit board is provided with a timing control circuit;

wherein the source electrode driving circuit comprises at least one first source electrode chip on film and at least one second source electrode chip on film, the first source electrode chip on film is bound to a first surface of the print circuit board close to the first display panel, and the second source electrode chip on film is formed on a second surface of the print circuit board close to the second display panel.

* * * * *